United States Patent
Peterson

(10) Patent No.: US 10,114,576 B2
(45) Date of Patent: Oct. 30, 2018

(54) STORAGE DEVICE METADATA SYNCHRONIZATION

(71) Applicant: SanDisk Technologies LLC, Plano, TX (US)

(72) Inventor: James G. Peterson, San Jose, CA (US)

(73) Assignee: SanDisk Technologies LLC, Addison, TX (US)

( * ) Notice: Subject to any disclaimer, the term of this patent is extended or adjusted under 35 U.S.C. 154(b) by 0 days.

(21) Appl. No.: 14/519,843

(22) Filed: Oct. 21, 2014

(65) Prior Publication Data
US 2016/0026408 A1     Jan. 28, 2016

Related U.S. Application Data

(60) Provisional application No. 62/028,730, filed on Jul. 24, 2014.

(51) Int. Cl.
G06F 3/06       (2006.01)
G06F 12/02      (2006.01)

(52) U.S. Cl.
CPC .......... *G06F 3/0644* (2013.01); *G06F 3/0608* (2013.01); *G06F 3/0679* (2013.01); *G06F 12/0253* (2013.01); *G06F 12/02* (2013.01)

(58) Field of Classification Search
CPC ...... G06F 3/0644; G06F 12/02; G06F 3/0608; G06F 3/0679
See application file for complete search history.

(56) References Cited

U.S. PATENT DOCUMENTS

| | | | | |
|---|---|---|---|---|
| 2011/0066808 A1* | 3/2011 | Flynn | ......... | G06F 12/0246 711/118 |
| 2013/0166855 A1* | 6/2013 | Batwara | ......... | G06F 3/0608 711/154 |
| 2013/0227236 A1* | 8/2013 | Flynn | ......... | G11C 16/26 711/165 |
| 2013/0275391 A1* | 10/2013 | Batwara | ......... | G06F 17/30085 707/689 |
| 2014/0189209 A1* | 7/2014 | Sinclair | ......... | G06F 12/0246 711/103 |

* cited by examiner

*Primary Examiner* — Ann J Lo
*Assistant Examiner* — Masud Khan
(74) *Attorney, Agent, or Firm* — Loza & Loza, LLP; Gabriel Fitch

(57) ABSTRACT

Embodiments are disclosed relating to garbage collecting storage blocks in a storage device. In one embodiment, data is selected for relocation from a storage block in a storage device during reclaiming of the storage block. The data may be selected based on metadata that identifies whether data is valid at a time when the reclaiming is initiated. In some embodiments, prior to relocating data from the storage block, the metadata is captured from a data structure that identifies whether data on the storage device is valid. In one embodiment, a determination of whether the selected data has become invalid due to other data that is stored during the reclaiming is made. In some embodiments, in response to determining that the selected data has become invalid, the selected data is specified as invalid in the data structure.

16 Claims, 8 Drawing Sheets

STORAGE DEVICE METADATA SYNCHRONIZATION

BACKGROUND

Technical Field

This disclosure relates generally to storing data on a physical recording medium, and more specifically, to reclaiming storage blocks of the physical recording medium.

Description of the Related Art

Modern storage systems may arrange data on a recording medium using a log-structure in which data may be written at an append point that starts at an initial portion in the medium and advances forward as writes are performed. When a piece of data is initially stored and then modified, rather than replacing the original instance on the medium at its current location, the modified data is written to the append point. The original instance is then marked as invalid since storage is no longer warranted. In the interim, the original instance may remain on the medium occupying space. To prevent a storage system from eventually becoming full, storage blocks may be reclaimed so that they can be used again for storage. In some instances, reclaiming storage blocks may include relocating and/or consolidating data elsewhere if is still warrants being stored.

Storing data using a log structure can be advantageous in many circumstances. For example, if data becomes corrupted as it is being stored, the log structure can be replayed in order to potentially recover previous instances of the data. Solid-state devices can also benefit from using a log structure since it can produce a more even distribution of writes across a medium, resulting in less wear leveling. In some instances, however, implementing a log structure may be more difficult than other storage schemes because it typically results in the generation of additional metadata.

SUMMARY

In one embodiment, an apparatus is disclosed that includes a reclamation module and an invalidity module. The reclamation module is configured to select data to be relocated from a storage block in a storage device during reclaiming of the storage block. The reclamation module is configured to select valid data based on metadata that identifies whether data is valid at a time when the reclaiming is initiated. In such an embodiment, the invalidity module is configured to receive an indication that the selected data has been replaced by other data that is stored in the storage device during the reclaiming, and to invalidate, in response to the indication, the selected data after the selected data has been relocated.

In another embodiment, an apparatus is disclosed that includes a groomer module, a storage module, a tracker module, and a metadata module. The groomer module is configured to perform a grooming operation for a first storage block within a storage device, where the grooming operation includes identifying data to copy from the first storage block to a second storage block at a first append point positioned at a location other than a head of a storage log. The storage module is configured to store data unrelated to the grooming operation at a second append point positioned at the head of the storage log. The tracker module is configured to track storage operations performed by the storage module during the grooming operation. The metadata module is configured to instruct the groomer module to not copy at least a portion of the identified data in response to one or more of the tracked storage operations modifying data associated with the identified.

In yet another embodiment, a method is disclosed. The method includes garbage collecting a storage block in a storage device such that the garbage collecting includes relocating data from the storage block to another storage block at a first append point that is internal to a storage log of the storage device. The method includes writing, during the garbage collecting, data unrelated to the garbage collecting at a second append point that is at a head of the storage log. The method further includes updating, based on the written data, entries in a data structure, where the entries specify whether the relocated data of the storage block is valid.

Figure 1:
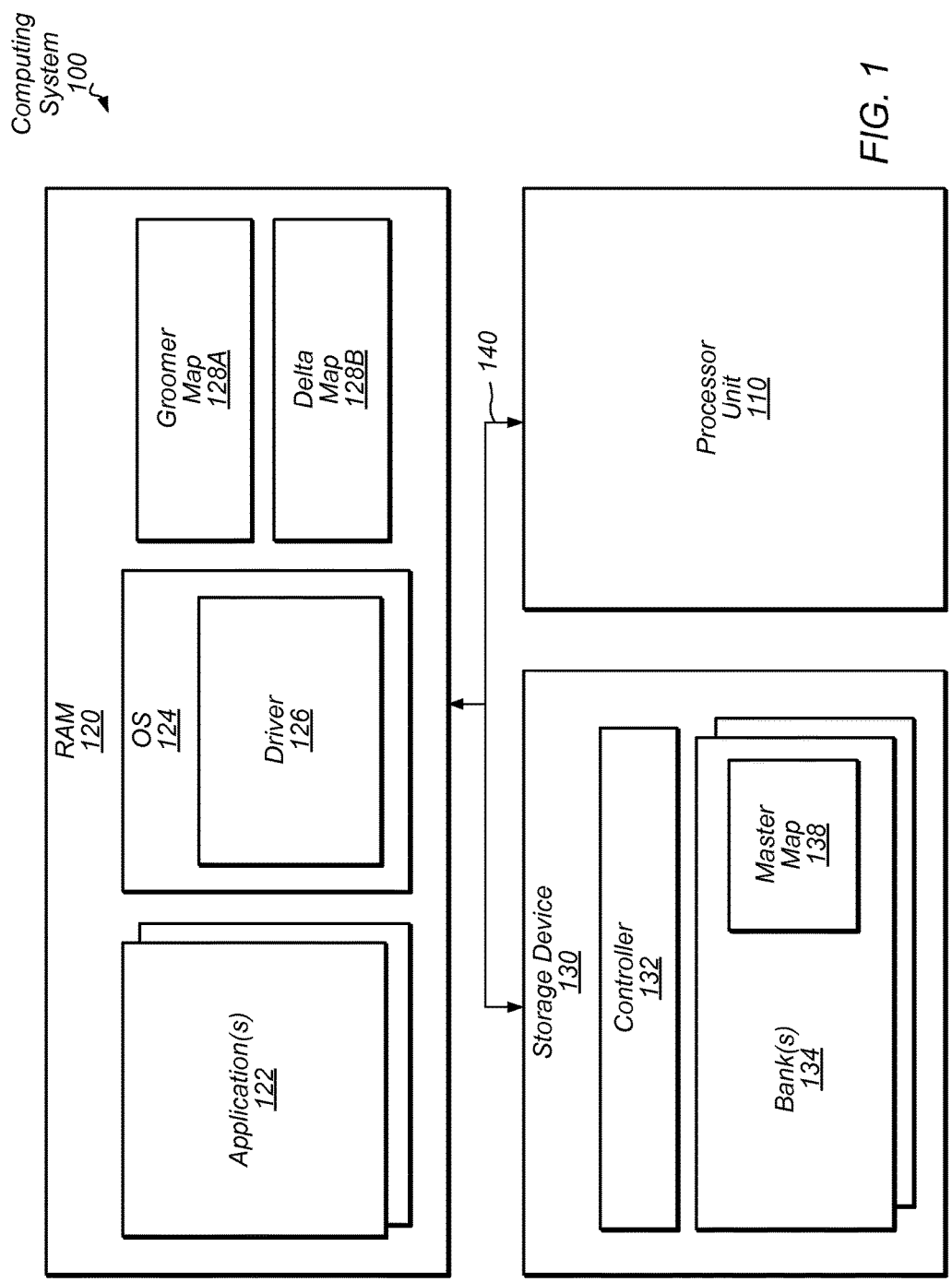
FIG. 1 is a block diagram illustrating one embodiment of a computing system that is configured to reclaim storage blocks of a storage device.

The disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

This disclosure includes references to the accompanying drawings. In the drawings, similar references typically identify similar components, unless context dictates otherwise. The illustrative embodiments described in the detailed description and drawings are not meant to be limiting. Other embodiments may be utilized, and other changes may be made to these exemplary embodiments, without departing from the scope of the disclosure.

Various units, circuits, or other components in this disclosure may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in a manner that is capable of performing the task(s) at issue. Reciting that a unit/circuit/component is "configured to"

perform one or more tasks is expressly intended not to invoke 35 U.S.C. § 112, sixth paragraph, for that unit/circuit/component.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

As used herein, the terms "first," "second," etc. are used as labels for nouns that they precede, and do not imply any type of ordering (e.g., spatial, temporal, logical, etc.). For example, in a storage device having multiple storage blocks, the terms "first" and "second" storage blocks can be used to refer to any two storage blocks. In other words, the "first" and "second" storage blocks are not limited to an initial storage block and an adjacent storage block.

DETAILED DESCRIPTION

The present disclosure describes embodiments in which storage blocks may be groomed (i.e., reclaimed or garbage collected) while other data (i.e., data unrelated to the grooming) is being written to a storage device. In many instances, grooming storage blocks in this manner complicates storing data because new data being written can potentially replace data that is being relocated during the reclaiming. For example, an application might modify a portion of a file that resides in a storage block being reclaimed. Ensuring that the application later receives the correct file portion (i.e., the modified portion and not the original file portion) can be difficult if the original portion has been moved from its original location. Still further, modification of the file portion may occur while the original file portion is being relocated.

As will be described below, in various embodiments, a computing system may maintain a data structure that identifies whether data is valid or invalid on a storage device. As used herein, the term "valid" refers to data that still warrants being stored by a storage device. In contrast, the term "invalid" refers to data that no longer warrants being stored. Accordingly, valid data may become invalid for various reasons. For example, as discussed above, modifying an instance of data may make any previous instances of the data invalid. In some embodiments, valid data may also become invalid responsive to a TRIM command.

In various embodiments, when a determination to groom a region of a storage device is made, the computing system may access a portion of the data structure that is relevant to the region in order to identify valid data to be relocated—the accessed portion specifying the state of the data in the region (i.e., whether the data is valid or not) prior to grooming being initiated. During the grooming, in one embodiment, the computing system may further track operations that invalidate data in the region (e.g., storage operations that modify data, TRIM operations, etc.). In some embodiments, this tracking may include creating a temporary data structure for the region that specifies whether data has become invalid since grooming began. Based on the tracking, the computing system may then determine whether any relocated data has become invalid and mark the data accordingly.

In many instances, tracking data validity in this manner allows a computing system to efficiently performing grooming while servicing data storage requests from applications. In some embodiments, tracking data in this manner may also allow the computing system to implement a storage log having multiple append points as will be described below.

The disclosure initially describes, with reference to FIG. 1, a computing system configured to implement grooming in conjunction with data storage. To facilitate this description, a layout of one embodiment of a storage device is discussed with respect to FIG. 2; storage logs that employ single and multiple append points are discussed with respect to FIGS. 3A and 3B. A driver that enables the computing system to support grooming and data storage is described with reference to FIG. 4. Other embodiments related to grooming are described in further detail with reference to FIGS. 5A, 5B, and 6. An exemplary storage system that includes such a computing system is finally described with reference to FIG. 7.

Turning now to FIG. 1, a block diagram of computing system 100 is depicted. Computing system 100 may be any suitable type of computing device such as a server, laptop, desktop, mobile device, etc. In some embodiments, computing system 100 may include multiple computing devices working together. For example, in one embodiment, computing system 100 may be multiple servers coupled together at a data center configured to store data on behalf of multiple clients such as the storage system discussed below in conjunction with FIG. 7. In the illustrated embodiment, computing system 100 includes a processor unit 110, random access memory (RAM) 120, and one or more storage devices 130 coupled together via an interconnect 140. As shown, RAM 120 may include program instructions for one or more applications 122 and an operating system (OS) 124 executable by processor unit 110. OS 124 may include a driver 126 for storage device 130, which, in turn, may include a controller 132 and one or more storage banks 134. In the illustrated embodiment, RAM 120 further includes a groomer map 128A and a delta map 128B; storage device 130 includes a master map 138.

In various embodiments, driver 126 is described as having various functionality. This functionality may be implemented in software, hardware or a combination thereof. Further, such functionality may be implemented by software outside of OS 124—e.g., as an application 122, in one embodiment. In another embodiment, this functionality may be implemented by software stored within a memory of controller 132 and executed by a processor of controller 132. In still another embodiment, controller 132 may include dedicated circuitry to implement functionality of driver 126. In sum, the depiction of driver 126 as being implemented in software within OS 124 should not be seen as limiting, but rather as a depiction of an exemplary embodiment.

Storage devices 130 are representative of any physical medium upon which data can be accessed. As used herein, the term "accessed" refers broadly to the process of an electronic computing device storing, writing or otherwise transferring one or more data values on to some physical medium for subsequent use. Accordingly, a "physical recording medium" is used herein to refer to any medium on which data may be recorded by an electronic computing device. Further, the terms "storage" and "memory" are used herein to be synonymous with "physical recording medium." Given this broad definition, the designations memory (when referring to RAM 120) and storage (when referring to a storage device 130) in FIG. 1 and elsewhere in this disclosure may refer to volatile and/or non-volatile media. Such media may also be referred to herein as "memory," and portions of such media may be referred to as "elements," "blocks," "cells," "storage blocks," "memory blocks," etc. Collectively, a group of these blocks may be referred to as a "storage array," "memory array," etc. The term "solid-state storage array" may be used herein to refer to a storage array that includes non-volatile solid-state media such as the various forms of media described below.

In some embodiments, storage devices 130 may be implemented such that they include non-volatile memory. Accordingly, in such an embodiment, storage devices may include non-volatile storage devices such as hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writable optical drives (e.g., CD drives, DVD drives, Blu-Ray drives, etc.) etc.

In some embodiments, storage devices 130 may be implemented such that they include non-volatile solid-state memory. Accordingly, in such an embodiment, storage devices 130 may include any suitable type of solid-state storage media including, but not limited to, NAND flash memory, NOR flash memory, nano RAM (NRAM), magneto-resistive RAM (MRAM), phase change RAM (PRAM), Racetrack memory, Memristor memory, nanocrystal wire-based memory, silicon-oxide based sub-10 nanometer process memory, graphene memory, Silicon-Oxide-Nitride-Oxide-Silicon (SONOS), Resistive random-access memory (RRAM), programmable metallization cell (PMC), conductive-bridging RAM (CBRAM), etc. In some embodiments, storage devices 130 may include multiple, different types of solid-state storage media.

Controller 132, in one embodiment, is configured to manage operation of a storage device 130. Accordingly, controller 132 may facilitate performance of read operations at specified addresses (e.g., "physical addresses" as discussed below) including selecting the appropriate banks 134, and accessing the data within those banks 134. Controller 132 may facilitate performance of write operations including programming of particular cells. Controller 132 may also perform preparation operations to permit subsequent writes to a storage device 130 such as, in one embodiment, erasing blocks of cells for subsequent reuse. (The cycle of programming and erasing a block of cells may be referred to as a "PE cycle.") In some embodiments, controller 132 implements separate read and write data pipelines to perform read and write operations in parallel. In one embodiment, controller 132 is also configured to communicate with driver 126 (discussed below) over interconnect 140. For example, in some embodiments, controller 132 communicates information for read and write operations via direct memory access (DMA) transactions coordinated by a DMA controller. Accordingly, controller 132 may support any suitable interconnect type such as a peripheral component interconnect (PCI), PCI express (PCI-e), serial advanced technology attachment (serial ATA or SATA), parallel ATA (PATA), small computer system interface (SCSI), IEEE 1394 (FireWire), Fiber Channel, universal serial bus (USB), etc. In some embodiments, controller 132 may also perform other operations such as error checking, data compression, encryption and decryption, packet assembly and disassembly, etc.

In various embodiments, a storage device 130 is organized as a log-structured storage. As used herein, the term "log structure" refers to an arrangement of data on a storage medium in which an append point is used to determine where data is stored; the append point is advanced sequentially through an "address space" as data is stored. A log-structured storage is simply a storage device that is organized using a log structure. The use of a log structure also connotes that metadata is stored in conjunction with the data in order to permit the storage device 130 to be restored to a previous state (i.e., a "log checkpoint"). Such a restoration may be performed, for example, to facilitate crash recovery in the event of power loss, to recover a last known valid state in the event of data corruption, etc. As used herein, the term "address space" refers to an address range (i.e., a collection of one or more addresses) that can be used to specify data within a storage device. As will be described below, a log-structured storage may have both logical and physical address spaces. The term "logical address space" refers to an address space as perceived by higher-level processes (e.g., applications 122 and OS 124) even though this address space may not be representative of how data is actually organized on the physical media of a storage device 130 or the actual number of physical address locations actually in use, reserved, or allocated to a higher-level process. In contrast, the term "physical address space" refers to the address space used by lower-level processes and may be indicative of how data is organized on the physical media of a storage device 130 and the actual number of physical address locations in use by a higher-level process. Embodiments of a log structure are discussed in further detail in conjunction with FIGS. 3A and 3B.

Master map 138, in one embodiment, is a data structure that includes metadata for operating storage device 130. In various embodiments, this metadata includes validity information that identifies where valid and invalid data is stored within storage device 130. For example, in one embodiment, master map 138 may include a bitmap where each bit specifies whether a respective physical block includes valid data or invalid data. Validity information may be specified using any suitable granularity—e.g., on an erase-block basis, page basis, codeword basis, etc. In some embodiments, master map 138 may also include information in addition to validity information. Accordingly, in one embodiment, master map 138 includes mapping information usable to map (i.e., translate) logical addresses to physical addresses within storage device 130. That is, as data becomes moved and invalid, it may reside in different physical addresses on storage device 130 over time. Through the use of master map 138, however, an application may be able access a most recent set of data by specifying the same logical address (e.g., the same logical block address (LBA)) even though two or more versions of the data may reside in different physical addresses. (In other embodiments, separate data structures may be used for logical address translations and for validity information.) Master map 138 may be implemented using any suitable data structure. Accordingly, in one embodiment, master map 138 is a binary-tree data structure. In others embodiments, master map 128 may be an array, a linked list, a hash table, etc. Although depicted in the illustrated embodiment as residing in storage device 130, all or portion of master map 138 may reside in RAM 120 as well in some embodiments.

OS 124, in one embodiment, implements a file system to facilitate the retrieval of data from storage devices 130 by applications 122. As used herein, the term "application" (or "process") refers generally to a collection of program instructions executable by one or more processors. Examples of applications may include, for example, OS 124, a file system manager, a database management system (DBMS), a user space library, a driver (e.g., driver 126, filter drivers, a redundant array of independent disks (RAID) driver, etc.), etc.

Driver 126, in one embodiment, is executable to permit applications 122 and OS 124 to interact with storage devices 130. Accordingly, driver 126 may receive requests to perform read and write operations at specified logical addresses and may issue corresponding commands to controller 132 to implement those operations. In some embodiments, to facilitate performance of read and write operations, driver 126 maintains metadata for storage device 130 such as master map 138 (in other embodiments, metadata may be maintained by other entities, such as at controller 132). In some embodiments, driver 126 manages garbage collection for storage devices 130 to reclaim storage blocks with invalid data. As used herein, "reclaiming," "grooming," and "garbage collecting" refer to preparing the storage block for reuse (i.e., so that the storage block can store new data). In the case of flash media, reclamation may include copying valid data out of the storage block and erasing the block. In various embodiments, driver 126 may perform garbage collection in conjunction with storage of new data (i.e., data that is being stored independent of the data being relocated during garbage collection). As will be described below, in the illustrated embodiment, driver 126 maintains a groomer map 128A and a delta map 128B in order to performer these operations in parallel.

Groomer map 128A, in one embodiment, includes validity information for storage blocks being groomed. In some embodiments, upon determining to initiate grooming, driver 126 may create groomer map 128A by capturing a portion of master map 138 that is relevant to the storage blocks being groomed—thus, groomer map 128A may specify the state of validity information at the time grooming is initiated (i.e., prior to any data being relocated). In such an embodiment, driver 126 may use groomer map 128A to identify valid data within a storage block being groomed in order to determine what data should be relocated during the grooming. Still further, after valid data has been relocated, groomer map 128A may be used to identify what data was relocated during the grooming. For example, if all valid data within a storage block was successfully relocated, driver 126 may deduce that a particular data block has been relocated in response to groomer map 128A indicating that the particular data block was valid. In another embodiment, driver 126 may also record what blocks have been relocated in groomer map 128A in order to determine what data was relocated.

Delta map 128B, in one embodiment, tracks the storage of new data during grooming. In some embodiments, delta map 128 may track all storage operations to storage device 130. In other embodiments, delta map 128 may track only storage operations that are relevant to the region being groomed—e.g., in one embodiment, delta map 128B may track storage operations that specify logical addresses mapped to physical addresses in the region. Delta map 128B may also track storage operations using any suitable data structure. For example, in one embodiment, delta map 128B may include a list of logical addresses written to during grooming. In another embodiment, delta map 128B may include a bitmap corresponding to the groomed region such that bits within the bitmap correspond to physical addresses in the region and identify whether data residing at those locations have been replaced by new data. In other words, upon receiving a request to store new data, driver 126 may examine the logical address specified in the request to determine whether it maps to data in the region being groomed and, if it does, set a bit of the corresponding physical address having the pervious instance of data. In other embodiments, delta map 128B may be implemented differently, however.

In various embodiments, driver 126 may analyze one or both of maps 128 to determine whether relocated data has become invalid due to the storage of new data. In some embodiment, this analysis may include comparing maps 128 to determine whether overlap exists between the relocated data and the new data. For example, in one embodiment in which maps 128 include bitmaps, maps 128 may be compared by performing an exclusive OR (XOR) of the bitmaps. Based on this analysis, in various embodiments, driver 126 may modify validity information in master map 138 for any relocated data determined to have become invalid. As used herein, the term "invalidate" refers to the marking of data as invalid (e.g., storing validity information in map 138); the term may also refer to the act of storing new data that makes a previous instance of data invalid—thus, a write that modifies data may be said to invalidate a previous instance of the data. In some embodiments, driver 126 may analyze maps 128 in real time (i.e., as data is being relocated during grooming and new data is being stored). In other embodiments, driver 126 analyzes maps 128 and invalidates data after grooming has occurred (i.e., after the data has been relocated).

In some embodiments, driver 126 is able to analyze maps 128 and invalidate relocated data afterwards through the use of multiple append points. As discussed above, storage device 130 may be organized as a log-structured storage. In some embodiments, a characteristic of this organization scheme is that older data precedes newer data. That is, as data is written at an append point, data located near the append point is newer than data located further from the append point. Thus, it possible to determine the newest instance of a piece of data by examining its proximity to the append point relative of other instances of the data. As will be described below in conjunction with FIG. 3B, in some embodiments, driver 126 may relocate data to a first append point that is staggered behind a second append point where it stores new data. By using a staggered append point for relocated data, driver 126 can ensure that a relocated piece of data (i.e., data block) does not leapfrog a newer instance of that piece of data—thus, ensuring that the newer instance of data can be identified based on location in the log-structured storage. Grooming data in conjunction with new-data storage is described below in further detail with respect to FIG. 4.

Figure 2:
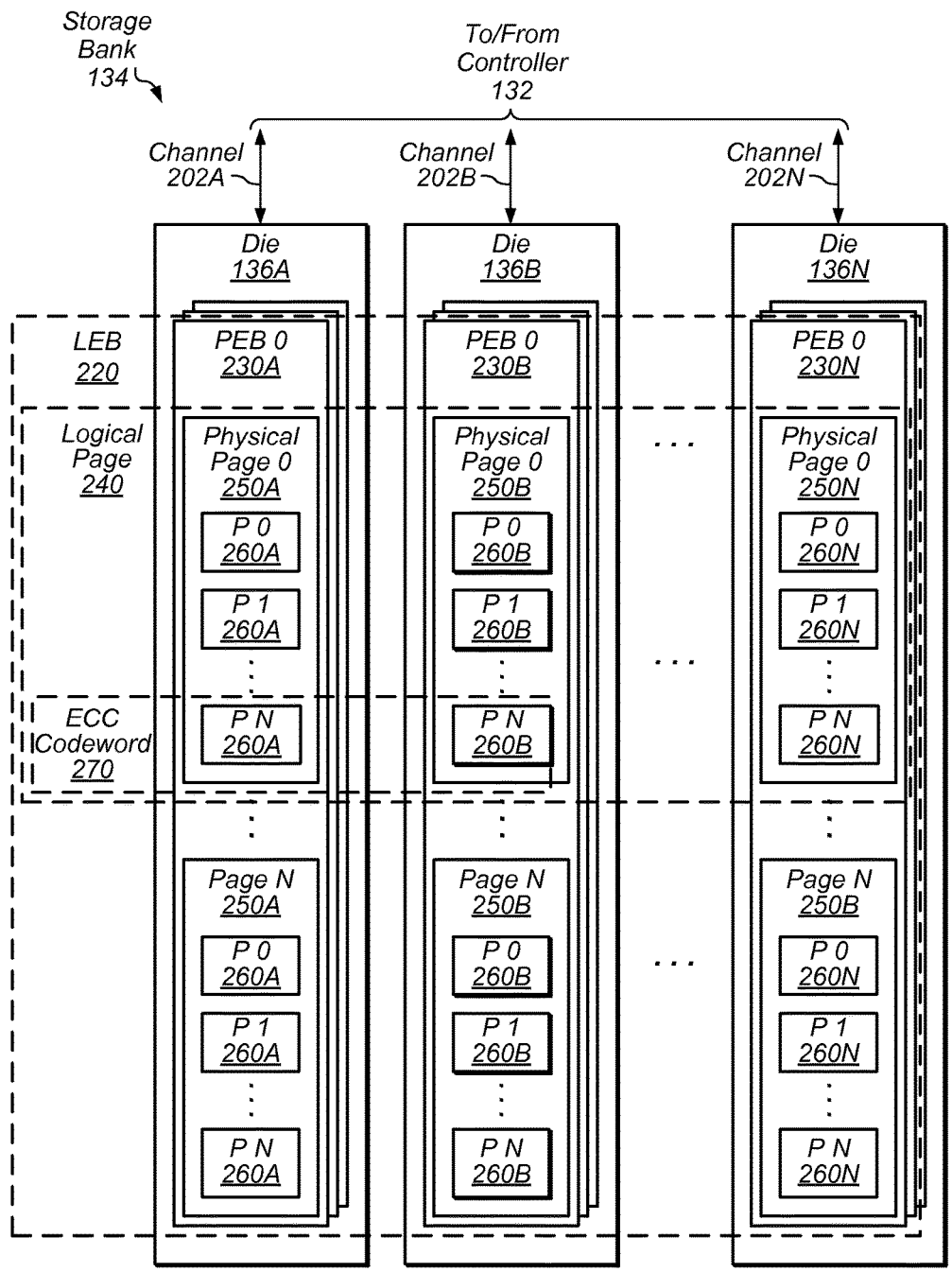
FIG. 2 is a block diagram illustrating one embodiment of components within the storage device.

Turning now to FIG. 2, a block diagram of storage elements within storage device 130 is depicted. As noted above, in some embodiments, storage elements may be arranged into banks 134. In the illustrated embodiment, a storage bank 134 is organized into logical erase blocks (LEBs) 220 that include multiple physical erase blocks (PEBs) 230, which are located in separate dies 136. A logical erase block 220 is further divided into multiple logical pages 240 that, in turn, include multiple physical pages 250. Physical pages 250 include multiple packets 260, which may be grouped into error correcting code (ECC) codewords 270.

As used herein, the term "erase block" refers broadly to a logical erase block or a physical erase block. In one embodiment, a physical erase block 230 represents the smallest storage block with a die 136 that can be erased at a given time (e.g., due to the wiring of cells on the die). In one embodiment, logical erase blocks 220 represent the smallest block erasable in a bank 134 by controller 132 in response to receiving an erase command. In such an embodiment, when controller 132 receives an erase command specifying a particular logical erase block 220, controller 132 may erase each physical erase block 230 within the logical erase block 220 simultaneously. (As used herein, the term "simultaneously" (as well as the phrase "in-parallel") refers to two or more operations that overlap for at least a portion in time. Accordingly, operations that begin and/or end at different times are still performed simultaneously if they overlap for at least some portion of time.) It is noted that physical erase blocks 230 within a given logical erase block 220 (e.g., blocks 230A and 230B) may be considered as contiguous in physical address space even though they reside in separate die 136. Thus, the term "contiguous" may be applicable not only to data stored within the same physical medium, but also to data stored within separate media.

In one embodiment, a physical page 250 represents the smallest storage block within a given storage bank 134 that can be written to at a given time. In one embodiment, a logical page 240 is the smallest writable storage block supported by controller 132. (In one embodiment, controller 132 may include a buffer configured to store up to a logical page worth of data; upon filling the buffer, controller 132 may write the contents of the buffer to a single logical page simultaneously.) In some instances, dividing a logical page 240 across multiple dies 136 may result in faster access times for a set of data when multiple dies 206 are accessed in parallel. Although a logical page 240 is shown as including physical pages 250 within the same bank 134 in the illustrated embodiment, a logical page 240 may include physical pages 250 located within separate logical erase blocks 220 and even separate banks 134 in other.

In one embodiment, a packet 260 represents the smallest storage block within a given storage bank 134 that can be read at a given time. In one embodiment, an ECC codeword 270 is the smallest storage block readable by controller 132. In some embodiments, packets 260 may be slightly larger than logical blocks 210 as they may include the contents of a logical block 210 (or multiple blocks 210 in some instances) as well as a packet header.

In the illustrated embodiment, each die 136 is accessible via a respective one of channels 202A-N such that packets 260 may be accessible concurrently. For example, storage device 130 may read packet P0 260A and P0 260B in parallel via channels 202A and 202B, respectively. In some embodiments, however, reading two packets from the same die 136 (e.g., packets P0 260A and P1 260A) may necessitate performing successive read operations. (In other embodiments, a given channel 202 may support multiple reads from the same die 136 in parallel.)

Figure 3A:
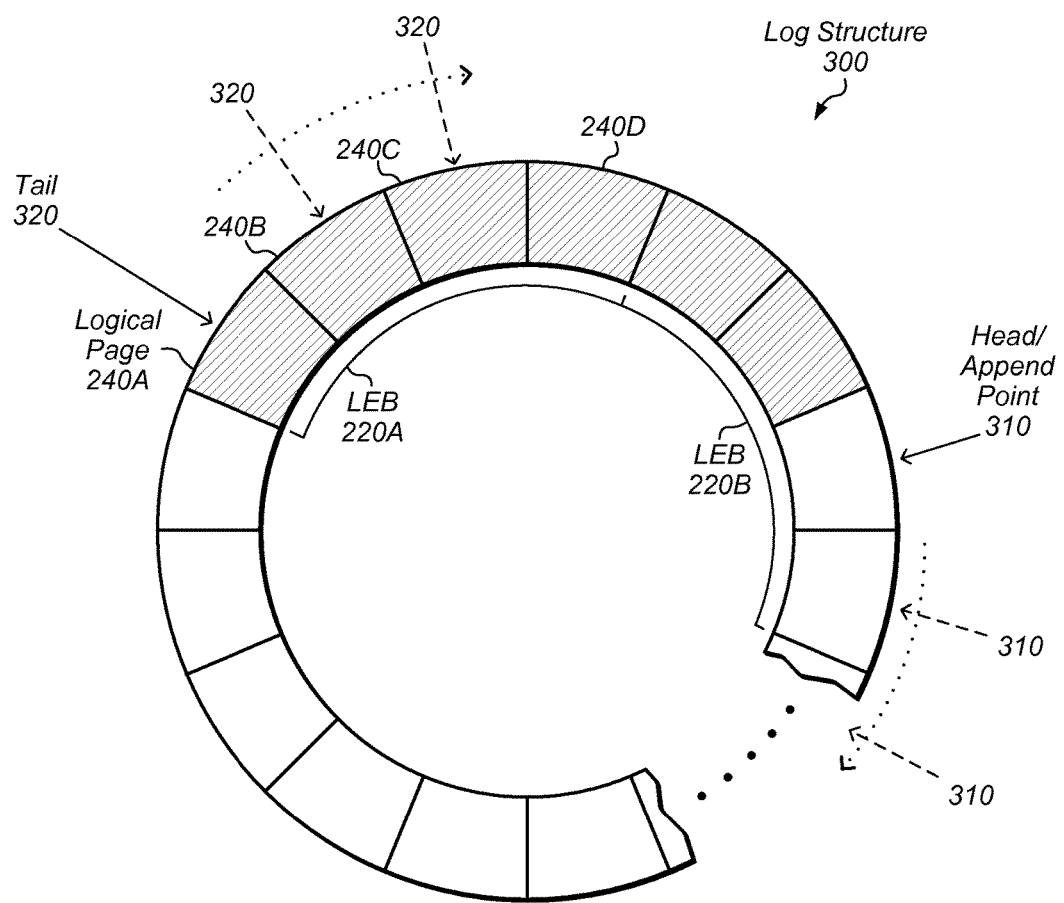
FIGS. 3A and 3B are block diagrams illustrating embodiments in which one or more append points are used to store data.

Turning now to FIG. 3A, a block diagram of log structure 300 representing a layout of data on storage device 130 is depicted. As shown, in various embodiments, data is stored sequentially at an append point 310 (also referred to as the "head") that starts at an initial logical page 240—e.g., page 240A. As additional data is stored, append point 310 advances to subsequent logical pages 240 in log structure 300—e.g., page 240B, 240C, and so on. (The term "adjacent" may be used to describe storage blocks that are written one after the other in sequential order. For example, as shown, logical page 240A is adjacent to logical page 240B; LEB 220A is adjacent to LEB 220B.) Eventually, after storing enough data, the append point 310 reaches the "last" page 240 in storage device 130, at which point the append point 310 wraps back to the initial logical page 240. Thus, log structure 300 is depicted as a loop/cycle. As more data is stored, the number of available logical pages 240 (shown as unshaded pages 240) decreases and the number of used logical pages 240 (shown as shaded pages 240) increases. As discussed above, in order to reuse these logical pages 240 (i.e., make them available to receive further writes), in one embodiment, driver 126 reclaims logical erase blocks 220. In one embodiment, a tail 320 is maintained to identify the oldest logical page 240 still in use within structure 300 (pages other than the one located at the tail are considered to be younger than the tail). When the logical erase block 220 with the oldest logical page 240 is eventually reclaimed, tail 320 is advanced forward to the next oldest logical page 240 in use at the end of log structure 300.

In general, data that is modified less frequently than other data in storage device 130 will migrate towards tail 320 (such data may be described as having a "colder temperature" or simply as "cold data"). On the other hand, data that is modified more frequently (described as having a "hotter temperature" or as "hot" data) will typically be located closer to head 310. Thus, valid data located in LEB 220A is likely "colder" than data in LEB 220B.

Figure 3B:
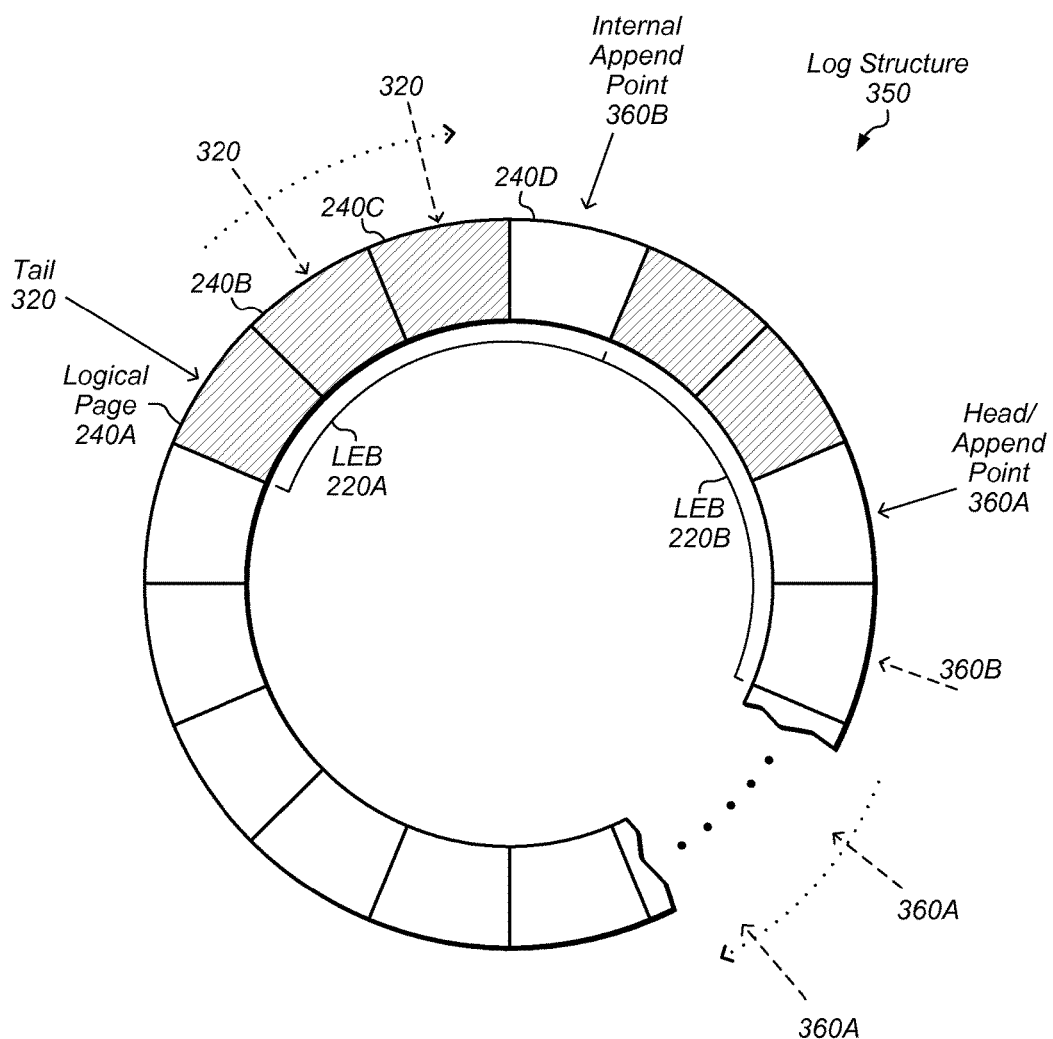

Turning now to FIG. 3B, a block diagram of another log structure 350 representing a layout of data on storage device 130 is depicted. In contrast to log structure 300 discussed above, in the illustrated embodiment, log structure 350 includes two append points: append point 360A and internal append point 360B. In one embodiment, when new data is written to log structure 350, the data is written at append point 360 A, which corresponds to the head of log structure 350. In such an embodiment, when data is relocated from tail 320 during grooming, however, data is relocated to internal append point 360B that is advanced through log structure 350. As used herein, the term "internal" is used to described an append point that is not located at the head. In various embodiments, in order to implement an internal append point, in various embodiments, spaces are periodically left by the ahead append point in order to leave room for data of the internal append point. For example, in the illustrated embodiment, append point 360A skips every fourth page 240; in other embodiments, different spacing schemes may be used.

By using internal append point 360B for relocated data, log structure 350 may be able to ensure that older data (i.e., the data being relocated) does not leapfrog newer data currently being written at append point 360A. Thus, if a failure of computing system 100 occurs while data is being written, the newest instance of a data block can be determined by starting at the last location of the head (i.e., append point 360A) and moving towards tail 320. In some embodiments, such a storage scheme may be simpler to implement than attempting to blend relocated data with new data when a single append point is used, such as with log structure 300.

In various embodiments, log structure 350 may also be implemented with more than two append points 360. In some embodiments, multiple append points may used to group data having common characteristics. Accordingly, in one embodiment, data may be grouped based how frequently it is modified—e.g., a first append point 360B for cold data, a second append point 360B for warm data, and a third append point 360B for hot data. In another embodiment, data may be grouped based on data type—e.g., application data, system data, etc.

Figure 4:
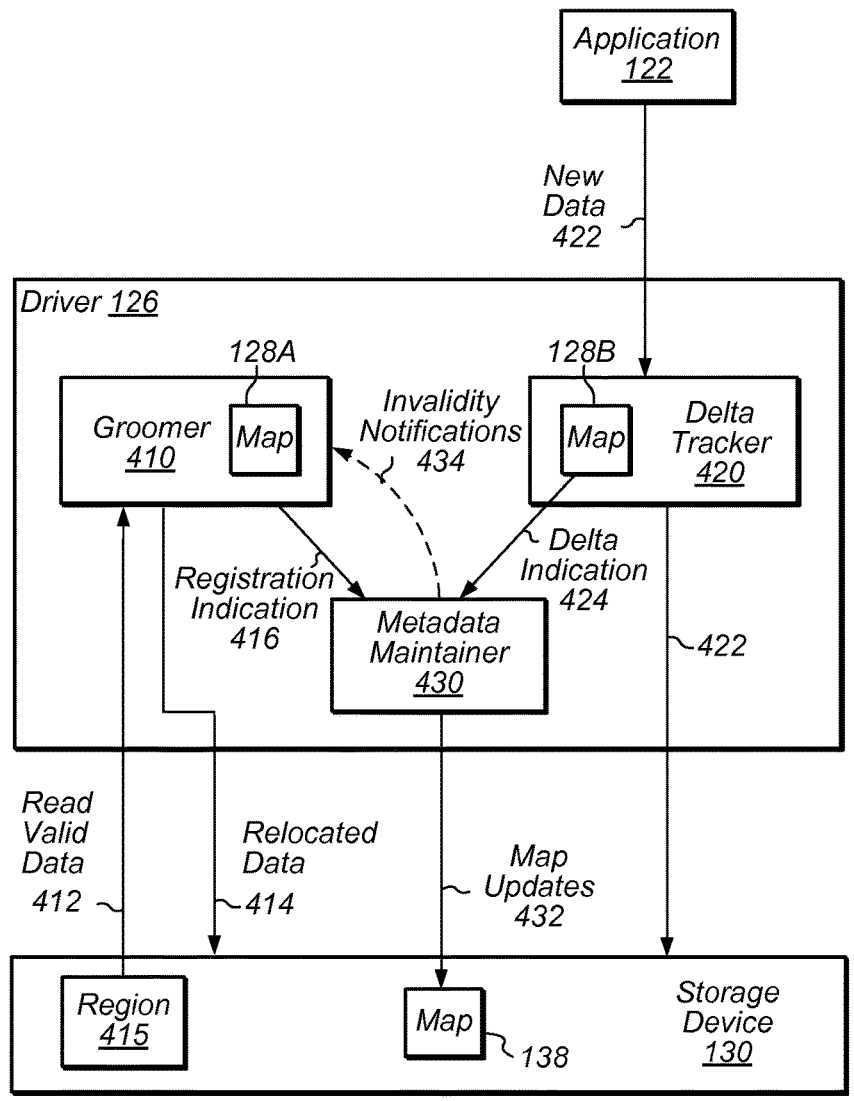
FIG. 4 is a block diagram illustrating one embodiment of a driver for the storage device.

Turning now to FIG. 4, a block diagram of driver 126 is depicted. As discussed above, in some embodiments, driver 126 may perform grooming in conjunction with storing new data. In the illustrated embodiment, driver 126 implements these two operations in parallel by using groomer 410, delta tracker 420, and metadata maintainer 430. In some embodiments, elements 410-430 may correspond to separate executable processes of driver 126 (or separate executable threads). In other embodiments, driver 126 may be implemented differently.

Groomer 410, in one embodiment, is executable to reclaim storage blocks within storage device 130. In the illustrated embodiment, groomer 410 is depicted as reclaiming region 415 by reading valid data 412 and relocating it as relocated data 414. As noted above, in various embodiments, groomer 410 may determine what data is valid and thus should be relocated based on groomer map 128A. In one embodiment, groomer 410 may generate groomer map 128A by copying a portion of master map 138 that is relevant to region 415 in response to grooming being initiated—thus, read valid data 412 may be data that is valid at the start of grooming region 415. In the illustrated embodiment, groomer 410 sends a registration indication 416 to notify metadata maintainer 430 of region 415 (i.e., the region being groomed).

Registration indication 416 may specify any of a variety of metadata indicative of region 415. For example, in one embodiment, registration indication 416 may specify the physical address range for region 415. In another embodiment, registration indication 416 may specify the relevant logical erase blocks 220 within region 415. Still further, in other embodiments, registration indication 416 may specify information with respect to the creation of groomer map 128A for region 415. For example, in one embodiment, registration indication 416 may specify the relevant portion of master map 138 from which groomer map 128A is derived.

Delta Tracker 420, in one embodiment, is executable to track storage operations of new data 422 (i.e., data being stored unrelated groomer 410). In the illustrated embodiment, delta tracker 420 may track storage operations by maintaining delta map 128B discussed above. Accordingly, as requests to store new data 422 are received, delta tracker 420 may store metadata in delta map 128B indicative of the new data 422—e.g., logical and/or physical addresses for the new data 422. In some embodiments, delta tracker 420 may track the storage of data performed any where within storage device 130. In other embodiments, delta tracker 420 may track data storage relating only to the data being relocated by groomer 410 (i.e., relating to data in region 415). Accordingly, in one embodiment, delta tracker 420 may receive registration indication 416 and track storage operations based on the information specified in the registration indication 416. In some embodiments, delta tracker 420 may also track operations other than storage operations of new data 422 that can potentially cause relocated data 414 to become invalid—e.g., in one embodiment, delta tracker 420 may store information about TRIM operations in delta map 128B. In the illustrated embodiment, delta tracker 420 provides metadata from delta map 128B to metadata maintainer 430 as delta indications 424.

Metadata maintainer 430, in one embodiment, is executable to maintain master map 138 by storing map updates 432. In various embodiments, map updates 432 include changes to validity information for data blocks—e.g., in one embodiment, map updates 432 may specify that particular physical addresses have invalid data. In some embodiments, map updates 432 may further include changes to translations for logical address to corresponding physical addresses. In various embodiments, when grooming is performed, metadata maintainer 430 may analyze metadata of maps 128 in order to determine whether read valid data 412 has become invalid and issue corresponding map updates 432. As discussed above, in some embodiments, this analysis may include a comparison of maps 128. For example, in one embodiment in which maps 128 include logical addresses, metadata maintainer 430 may determine that a portion of read valid data 412 has become invalid if the logical addresses of this portion match logical addresses of new data 422 in delta map 128B. In another embodiment, metadata maintainer 430 may merely analyze information in delta map 128B and registration indication 416. For example, if registration indication 416 specifies the physical address range for region 415, metadata maintainer 430 may merely determine that any new data 422 (as specified in delta map 128B) that has a logical address that mapped to a physical address in this range has invalidated a portion of read valid data 412.

Based on the outcome of this analysis, metadata maintainer 430 may take one of various actions. In one embodiment, if relocated data is determined to still be valid, metadata maintainer 430 may store a map update 432 in map 138 that specifies that the old instance of data in region 415 is invalid and the relocated instance is valid. In some embodiments, metadata maintainer 430 may also update the logical address translation for the data. On the other hand, if a portion of relocated data 414 is determined to no longer be valid, in one embodiment, metadata maintainer 430 may store a map update 432 indicating that the relocated portion is invalid (and invalidate the old instance if not yet done). In some embodiments, metadata maintainer 430 may also determine to forgo updating the logical address translation to the physical address of the relocate data. In various embodiments, metadata maintainer 430 may also handle map updates 432 for new data 422. Accordingly, upon a block of new data 422 being stored, metadata maintainer 430 may store a map update 432 specifying that data block is valid and specifying the logical address translation. In contrast to updates for relocated data 414, updates for new data 422 may be performed in conjunction with the storage of data 422, while, in some embodiments, updates for relocated data 414 may be delayed until a validity analysis can be performed. Upon completing such an analysis, in one embodiment, maps 128 may be discarded—e.g., in one embodiment, this event may be identified by groomer 410 sending a deregistration indication specifying the completion of grooming for region 415.

As noted above, in some embodiments, maps 128 may be analyzed while grooming is being performed. In illustrated embodiment, metadata maintainer 430 may send an invalidity notification 434 to indicate that a portion of data within region 415 has become invalid and does not warrant being relocated. In response to receiving such a notification, groomer 410 may determine to forgo relocating the portion—even though groomer 410 may have initially determined to relocate the data based on validity information specified in groom map 128A. That is, if a data block that was valid at the start of grooming becomes invalid due to new data 422, this data block does not warrant relocation since it does not merit preservation. Thus, metadata maintainer 430 can potentially reduce the amount of data relocated during grooming.

Although a single instance of groomer 410 is shown in the illustrated embodiment, driver 126 may include multiple instances of groomer 410 in some embodiments. In one embodiment, each groomer 410 may be implemented by a separately executing process (or separate thread) to groom a respective region 415. In such an embodiment, upon instantiation, each groomer 410 may select a region 415, create a respective groomer map 128A for the region, and send a corresponding registration indication 416. In response, metadata maintainer 430 may then analyze the data being relocated by each groomer 410. In such an embodiment, delta map 128B may track new-data storage for each of the regions being groomed. In some embodiments, each groomer 410 may also relocate data to a respective one of a plurality of append points (e.g., append points 360B) staggered relative to a head append point (e.g., head append point 360A). In one embodiment, each groomer 410 may be executable to relocate data having a particular temperature to its respective staggered append point. In some instances, relocating data in this manner can reduce write amplification since data having a similar temperature can be grouped and relocated together.

Figure 5A:
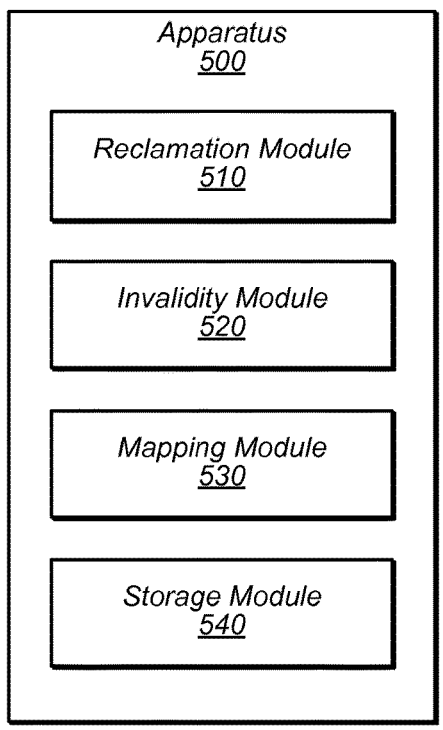
FIG. 5A and 5B are block diagrams illustrating embodiments of an apparatus that includes modules.

Turning now to FIG. 5A, a block diagram of an apparatus 500 including modules is depicted. As used herein, the term "module" refers to circuitry configured to perform operations or a memory having program instructions stored therein that are executable by one or more processors to perform operations. Accordingly, a module may be implemented as a hardware circuit in a variety of ways. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations. Apparatus 500 may include modules to implement any of the functionality described herein. For example, in the illustrated embodiment, apparatus 500 includes a reclamation module 510, invalidity module 520, mapping module 530, and storage module 540. In other embodiments, apparatus 500 may include more or less modules than shown.

Reclamation module 510, in one embodiment, is configured to select data to be relocated from a storage block (e.g., a logical erase block 220) in a storage device (e.g., storage device 130) during reclaiming the storage block. In such an embodiment, reclamation module 510 is configured to select valid data (e.g., read valid data 412) based on metadata (e.g., groomer map 128A) that identifies whether the data is valid at a time when the reclaiming is initiated. In some embodiments, apparatus 500 may include multiple reclamations modules 510 as discussed below. In some embodiments, reclamation module 510 may implement functionality of groomer 410 discussed above.

Invalidity module 520, in one embodiment, is configured to receive an indication (e.g., delta indication 424) that the selected data has been replaced by other data (e.g., new data 422) that is stored in the storage device during the reclaiming, and to invalidate, in response to the indication, the selected data after the selected data has been relocated. In some embodiments, reclamation module 510 is configured to identify, to invalidity module 520, a portion of the storage device (e.g., region 415) to which the metadata pertains, and invalidity module 520 is configured to track storage operations associated with data in the specified portion to detect whether the selected data has become invalid. In some embodiments, invalidity module 520 is configured to invalidate a portion of the selected while the selected data is being relocated. In one embodiment, invalidity module 520 may further instruct (e.g., via invalidity notifications 434) reclamation module 510 to not relocate at least a portion of the selected data in response to receiving an indication that the portion has been replaced by the other data. In some embodiments, invalidity module 520 may implement functionality of delta tracker 420 and/or metadata maintainer 430 discussed above.

Mapping module 530, in one embodiment, is configured to maintain a data structure (e.g., master map 138) that identifies data on the storage device that is valid. In some embodiments, reclamation module 510 is configured to capture the metadata from the data structure prior to relocating data from the storage block. In such an embodiment, invalidity module 520 is configured to invalidate the selected data by identifying the selected data as invalid in the data structure (e.g., via map updates 423). In some embodiments, invalidity module 520 may implement functionality of metadata maintainer 430 discussed above.

Storage module 540, in one embodiment, is configured to store the other data at a first append point (e.g., append point 360A) for a storage log of the storage device (e.g., via log structure 350), where the first append point corresponds to a head of the storage log. In some embodiments, reclamation module 510 is configured to relocate the data at a second append point for the storage log, where the second append point is an internal append point of the storage log (e.g., internal append point 360B). In one embodiment in which apparatus includes a plurality of reclamation modules 510, each reclamation module 510 is configured to reclaim storage blocks by relocating data at a respective one of a plurality of append points (e.g., multiple append points 360B) internal to the storage log. In such an embodiment, invalidity module 520 is configured to invalidate data relocated by the plurality of reclamation modules 510. In some embodiments, storage module 540 may implement functionality of storage controller 130.

In some embodiments, reclamation module 510, invalidity module 520, mapping module 530 and/or storage module 540 are within a controller such as controller 132. In another embodiment, one or more of modules 510-540 may be located within a memory such as memory 120. In sum, the modules of apparatus 500 may be implemented in any suitable manner to perform functionality described herein. Apparatus 500 may also correspond to any suitable structure having the functionality of modules 510-540. In one embodiment, apparatus 500 is a computing system that includes (or is coupled to) a storage device such as storage device 130. In another embodiment, apparatus 500 is a card including a controller (such as controller 132) and one or more storage elements (such as dies 136). In yet another embodiment, apparatus 500 is a computing system including a memory system that stores one or more of modules 510 and 540.

Figure 5B:
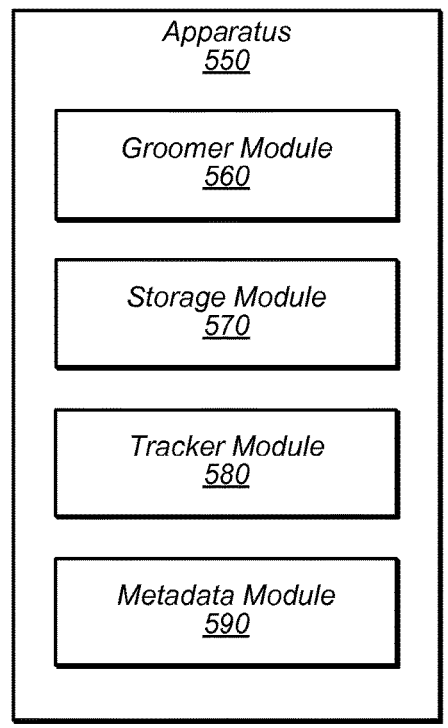

Turning now to FIG. 5B, a block diagram of an apparatus 550 including modules is depicted. Apparatus 550 may include modules to implement any of the functionality described herein and may correspond to any suitable structure such as those discussed above with respect to apparatus 500. In the illustrated embodiment, apparatus 550 includes a groomer module 560, storage module 570, tracker module 580, and metadata module 590. In other embodiments, apparatus 550 may include more or less modules than shown.

Groomer module 560, in one embodiment, is configured to perform a grooming operation for a first storage block (e.g., a logical erase block 220) within a storage device. In such an embodiment, the grooming operation includes identifying data (e.g., valid data 414) to copy from the first storage block to a second storage block (e.g., an available page 240) at a first append point. In some embodiments, the first append point is positioned at a location other than a head of a storage log (e.g., at internal append point 360B). In one embodiment, groomer module 560 is configured to register (e.g., via a registration indication 416) a region (e.g., region 415) of the storage device that is associated with the grooming operation. In some embodiments, groomer module 560 is configured to perform grooming operations for a plurality of regions of the storage device such that the grooming operations copy valid data to a respective one of a plurality of internal append points (e.g., multiple internal append points 360B). In some embodiments, groomer module 560 may implement functionality of groomer 410 discussed above.

Storage module 570, in one embodiment, is configured to store data (e.g., new data 422) unrelated to the grooming operation at a second append point (e.g., append point 360A) positioned at the head of the storage log.

Tracker module 580, in one embodiment, is configured to track storage operations (e.g., for new data 422) performed by storage module 570 during the grooming operation. In some embodiments, tracker module 580 is configured to track storage operations associated with the registered region identified by groomer module 560. In some embodiments, tracker module 580 is configured to track storage operations associated with each of the plurality of regions. In one embodiment, the tracked storage operations include TRIM operations. In some embodiments, tracker module 580 may implement functionality of delta tracker 420 discussed above.

Metadata module 590, in one embodiment, is configured to instruct groomer module 560 to not copy at least a portion of the identified data in response to one or more of the tracked storage operations modifying data associated with the identified data. In some embodiments, metadata module 590 is configured to invalidate, based on the tracked storage operations, data copied (e.g., relocated data 414) to the plurality of internal append points. In various embodiments, metadata module 590 is configured to maintain a validity map (e.g., master map 138) for the storage device such that the validity map identifies where valid data is stored within the storage device. In such an embodiment, groomer module 560 may be configured to identify the data to copy from the first storage block by accessing a portion of the validity map that is relevant to the registered region. In one embodiment, metadata module 590 is configured to invalidate the copied data by storing an indication (e.g., a map update 432) in the validity map that the copied data is invalid. In some embodiments, metadata module 580 is configured to invalidate the copied data by not modifying one or more translation for logical addresses of the copied data to corresponding physical addresses of the storage device. In some embodiments, metadata module 580 is configured to receive address information for data that has been modified by the storage operations, and in response to determining that the address information relates to the identified data, instruct groomer module 560 to not copy. In some embodiments, metadata module 580 may implement functionality of metadata maintainer 430 discussed above.

Figure 6:
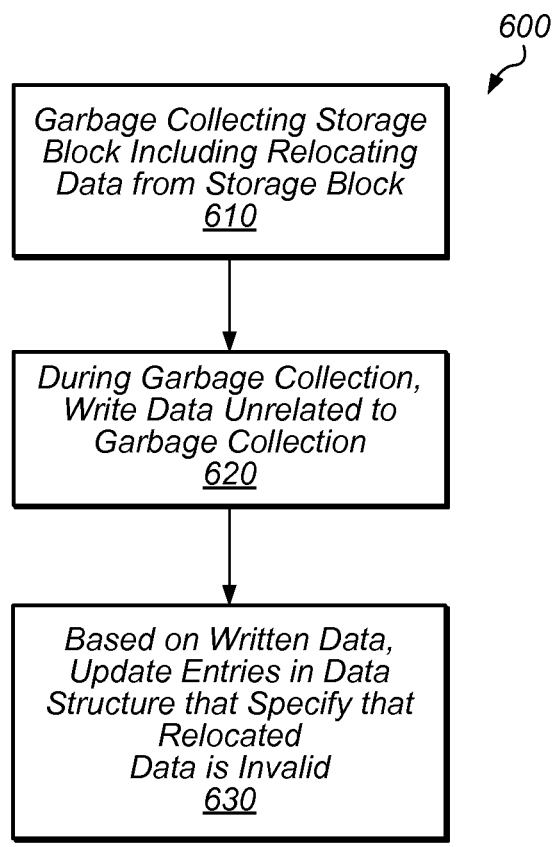
FIG. 6 is a flow diagram illustrating one embodiment of a method.

Turning now to FIG. 6, a flow diagram of a method 600 is depicted. Method 600 is one embodiment of a method that may be performed by an apparatus such as computing system 100 or storage device 130. Accordingly, in one embodiment, the apparatus may execute program instructions of a driver such as driver 126 to perform method 600. In some embodiments, performance of method 600 may simplify performance of garbage collection in conjunction with data storage.

In step 610, a storage block (e.g., a logical erase block 220) in a storage device is garbage collected. In such an embodiment, the garbage collection includes relocating data (e.g., read valid data 412) from the storage block to another storage block (e.g., as relocated data 414) at a first append point (e.g., internal append point 360B) that is internal to a storage log (e.g., log structure 350) of the storage device. In some embodiments, step 610 includes copying a portion (e.g., groomer map 128A) of a data structure (e.g., master map 138) from the storage device into a volatile memory (e.g., RAM 120), and determining whether data is to be relocated based on the copied portion. In one embodiment, the copied portion is discarded in response to completion of the garbage collection. In some embodiments, step 610 further includes relocating data from a storage block to another storage block at a third append point (e.g., a second internal append point 360B) that is internal to the storage log, where the third append point is distinct from the first append point and the second append point. In some embodiments, step 610 includes identifying an initial set of data to be relocated during the garbage collection, prior to relocating the initial set of data, receiving an indication (e.g., an invalidity notification 434) that a portion of the initial set of data has become invalid, and determining to not relocate the portion of the initial set of data In step 620, during the garbage collection, data unrelated to the garbage collection (e.g., new data 422) is written at a second append point (e.g., append point 360A) that is at a head of the storage log.

In step 630, based on the written data, entries in a data structure (e.g., master map 139) are updated. In such an embodiment, the entries correlate to data of the storage block and specify that the relocated data is invalid. In some embodiments, based on the written data, translations (e.g., in master map 138) are updated for logical addresses to corresponding physical addresses of the storage device. In some embodiments, the storage device is a non-volatile solid state storage device.

Figure 7:
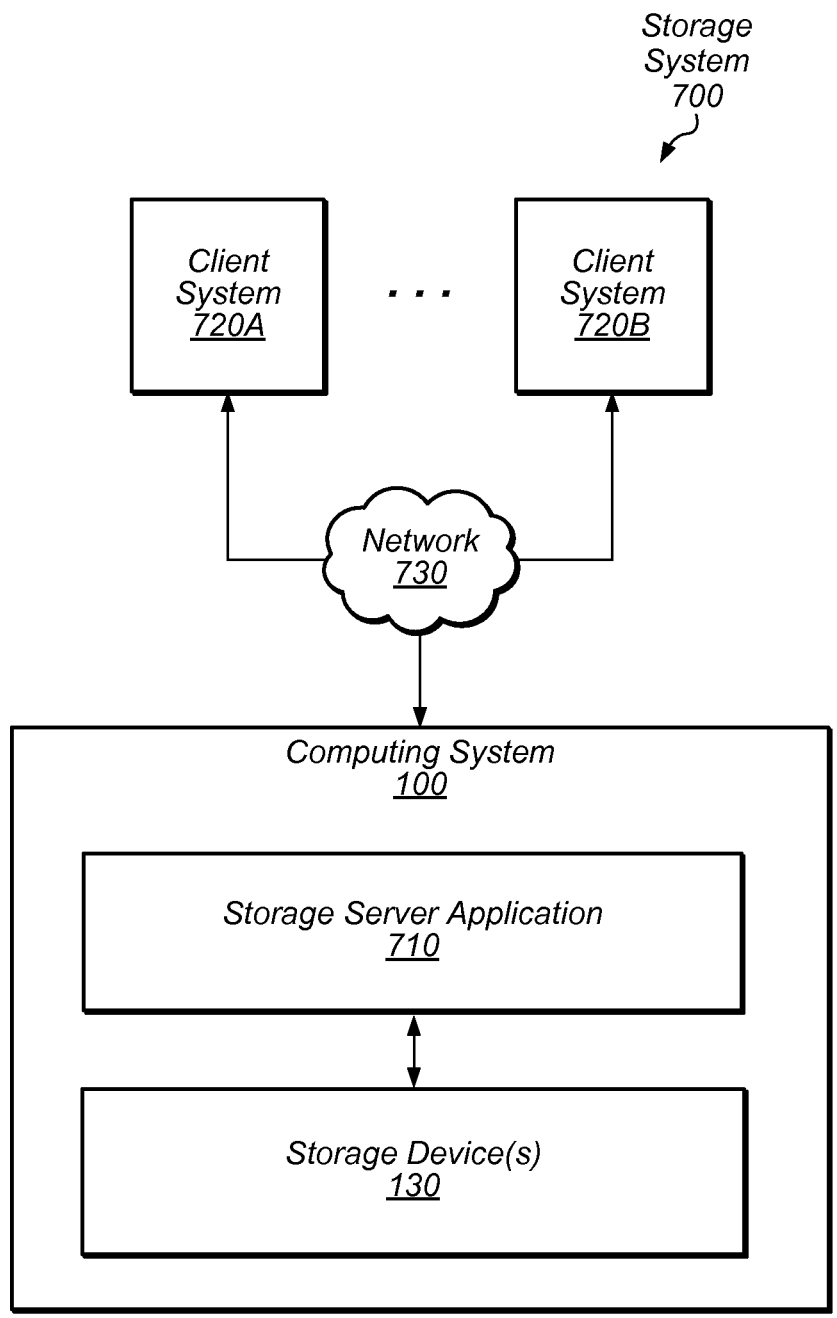
FIG. 7 is a block diagram illustrating one embodiment of a storage system including the computing system.

Turning now to FIG. 7, a block diagram of a storage system 700 including computing system 100 is depicted. As discussed above, computing system 100 may include one or more applications that operate on data stored in storage device 130. In the illustrated embodiment, computing system 100 executes a storage server application 710 to enable client systems 720A and 720B to access and store data in one or more storage devices 130 via network 730. For example, in one embodiment, storage system 700 may be associated with an enterprise environment in which server application 710 distributes enterprise data from storage device 130 to clients 720. In some embodiments, clients 720 may execute other server applications such as web servers, mail servers, virtual private network (VPN) servers, etc. to further distribute data to other computing systems. Accordingly, in some embodiments, storage server application 710 may implement various network attached storage (NAS) protocols such as the file transfer protocol (FTP), network file system (NFS) protocol, server message block (SMB) protocol, Apple file protocol (AFP), etc. In some embodiments, computing system 100 may be one of several computing systems 100 configured to implement a storage area network (SAN).

This disclosure has been made with reference to various exemplary embodiments. Those skilled in the art, however, will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system (e.g., one or more of the steps may be deleted, modified, or combined with other steps). Therefore, this disclosure is to be regarded in an illustrative rather than a restrictive sense, and all such modifications are intended to be included within the scope thereof Likewise, benefits, other advantages, and solutions to problems have been described above with regard to various embodiments. Benefits, advantages, solutions to problems, and any element(s) that may cause any benefit, advantage, or solution to occur or become more pronounced, however, are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus.

Additionally, as will be appreciated by one of ordinary skill in the art, principles of the present disclosure may be reflected in a program instructions on a machine-readable storage medium. Any tangible, non-transitory machine-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may further be loaded onto a general purpose computer, special purpose computer, or other programmable data processing apparatus to cause the apparatus to perform a set of operations that implement one or more functions described herein.

While the principles of this disclosure have been shown in various embodiments, many modifications of structure, arrangements, proportions, elements, materials, and components that are particularly adapted for a specific environment and operating requirements may be used without departing from the principles and scope of this disclosure. These and other changes or modifications are intended to be included within the scope of the present disclosure.

What is claimed is:

1. An apparatus, comprising:
    a storage controller configured to maintain a master map comprising associations between logical addresses of a logical address space and physical addresses of data stored on a storage medium;
    a groomer configured to reclaim storage blocks of the storage medium, wherein:
        to reclaim a storage block, the groomer is further configured to relocate data from the storage block, and record associations between physical addresses of the relocated data on the storage medium and corresponding logical addresses in a groomer map for the storage block, separate from the master map, such that the master map does not associate the logical addresses with the physical addresses of the relocated data on the storage medium;
        the storage controller is further configured to perform one or more storage operations while the groomer reclaims the storage block; and
        in response to the groomer reclaiming the storage block, the storage controller is further configured to determine whether portions of the relocated data were invalidated by the one or more storage operations by use of the groomer map for the storage block; and
    a delta map configured to track modifications to the master map corresponding to the one or more storage operations, wherein the storage controller is configured to compare the delta map to the groomer map to determine whether portions of the relocated data were invalidated by the one or more storage operations.

2. The apparatus of claim 1, wherein:
    the groomer is further configured to identify logical addresses associated with data stored within the storage block; and
    the storage controller is further configured to record modifications to the master map that pertain to the identified logical addresses in the delta map and ignore modifications to the master map that pertain to logical addresses other than the identified logical addresses.

3. The apparatus of claim 1, wherein:
    the storage controller is further configured to store data sequentially at a first append point for a storage log maintained on the storage medium;
    the first append point corresponds to a storage location at a head of the storage log; and
    the groomer is further configured to relocate data from the storage block at a second append point for the storage log, different from the first append point.

4. The apparatus of claim 3, wherein:
    the groomer is further configured to reclaim a plurality of storage blocks concurrently;
    reclaiming the plurality of storage blocks comprises relocating valid data stored on each of the plurality of storage blocks at respective append points of the storage log, each append point corresponding to a different storage block of the storage medium;
    relocating the valid data comprises maintaining groomer maps for each of the plurality of storage blocks, the groomer maps comprising translations between physical addresses of data relocated from the respective storage blocks and logical identifiers of the relocated data and being maintained separately from the master map; and
    the storage controller is further configured to determine whether data relocated from the plurality of storage blocks are valid by comparing the groomer maps to the one or more storage operations.

5. The apparatus of claim 1, wherein:
    the storage controller is further configured to determine that a storage operation of the one or more storage operations invalidates data selected for relocation from the storage block; and
    the storage controller notifies the groomer that the invalidated data does not need to be relocated from the storage block.

6. The apparatus of claim 5, wherein the storage controller is configured to determine that the storage operation invalidates the data selected for relocation from the storage block in response to one or more of:
    determining that the storage operation results in removing the particular logical address from the master map, and
    determining that the storage operation is configured to store data associated with the particular logical address on the storage medium.

7. An apparatus, comprising:
    a storage driver configured to record logical-to-physical associations between logical identifiers of a logical address space and storage locations of corresponding data packets stored on a storage device in a master map; and
    a groomer configured to perform a grooming operation for a first storage block of the storage device, wherein:
        performing the grooming operation comprises selecting data packets within the first storage block to retain on the storage device, relocating data packets, of the selected data packets, to a second storage block of the storage device, and recording logical-to-physical associations between storage locations of the relocated data packets within the second storage block and corresponding logical identifiers in a groomer map for the first storage block, separate from the master map, such that the logical-to-physical associations recorded in the groomer map differ from corresponding logical-to-physical associations of the master map;

the storage driver is further configured to issue a notification to the groomer that a particular one of the selected data packets is invalid in response to detecting a storage request that invalidates the particular data packet received after selection of the data packets by the groomer and before completion of the grooming operation; and the groomer is further configured to prevent the particular data packet from being relocated to the second storage block during the grooming operation based on the notification, wherein the groomer is further configured to register logical identifiers associated with the selected data packets with the storage driver, and wherein the storage driver is further configured to:
track storage requests pertaining to the registered logical identifiers received during the grooming operation,
record delta metadata pertaining to the tracked storage requests, and
exclude a logical-to-physical association recorded in the groomer map from the master map in response to determining that a relocated data packet corresponding to the logical-to-physical association is invalid by use of the recorded delta metadata.

8. The apparatus of claim 7, wherein:
the storage driver is further configured to determine that the particular data packet is invalid in response to detecting one or more of: a storage request to write data to a logical identifier associated with the particular data packet, and a storage request to TRIM the logical identifier associated with the particular data packet.

9. The apparatus of claim 8, wherein the groomer is further configured to:
determine logical identifiers corresponding to the selected data packets by use of the master map, and
instruct the storage driver to track storage operations pertaining to the determined logical identifiers during the grooming operation.

10. The apparatus of claim 9, wherein the storage driver is further configured to record delta metadata for the grooming operation by:
recording delta metadata for storage operations pertaining to the determined logical identifiers; and
ignoring storage operations pertaining to logical identifiers other than the determined logical identifiers.

11. The apparatus of claim 7, wherein the storage driver is further configured to update the master map with a logical-to-physical association pertaining to a relocated data packet stored within the second storage block recorded in the groomer map in response to verifying that the relocated data packet is valid by use of the recorded delta metadata.

12. The apparatus of claim 7, wherein, in response to completion of the grooming operation on the first storage block, the storage driver is further configured to:

identify valid relocated data packets stored within the second storage block based on the storage operations tracked while the grooming operation for the first storage block was being performed; and modify the master map to associate the identified valid relocated data packets with corresponding logical identifiers.

13. A method, comprising:
recording, in a first map, associations between logical addresses of a logical address space and data stored within respective storage blocks of a non-volatile storage medium;
implementing a garbage collection operation on a first storage block of the non-volatile storage medium, wherein implementing the garbage collection operation further comprises:
identifying logical addresses associated with data stored within the first storage block by the first map,
relocating data associated with one or more of the identified logical addresses from the first storage block, wherein relocating the data comprises storing the data within respective storage locations of a second storage block of the non-volatile storage medium and recording associations between storage locations of the data stored within the second storage block and respective logical addresses of the identified logical addresses in a second map, separate from the first map, such that the second map references data stored within the second storage block and the first map does not reference data stored within the second storage block, and
tracking storage operations performed during implementation of the garbage collection operation on the first storage block;
in response to completing the garbage collection operation on the first storage block,
determining whether portions of the relocated data are valid by comparing the associations recorded in the second map to the tracked storage operations, and
updating the first map with associations recorded in the second map pertaining to portions of the relocated data determined to be valid; and
invalidating relocated data stored within the second storage block in response to determining that one or more of the tracked storage operations pertain to a logical address associated with the relocated data.

14. The method of claim 13, further comprising invalidating relocated data stored within the second storage block in response to a logical address associated with the relocated data being removed from the first map during implementation of the garbage collection operation on the first storage block.

15. The method of claim 13, wherein:
the storage operations performed during implementation of the garbage collection operation on the first storage block comprise sequentially appending data at a first append point of a log maintained on the storage medium; and
relocating the selected data comprises sequentially appending the selected data at a second append point of the log, different from the first append point, such that the data of the one or more storage requests is sequentially appended within a storage block different from the second storage block.

16. The method of claim 13, wherein implementing the garbage collection operation on the first storage block further comprises:

monitoring storage operations pertaining to the identified logical addresses during implementation of the grooming operation on the first storage block;

detecting a storage operation that invalidates a portion of the data stored within the first storage block during implementation of the garbage collection operation and prior to relocating the portion of the data to the second storage block; and excluding the portion of the selected data from being relocated to the second storage block based on the detecting.

* * * * *